United States Patent Office

2,764,588
Patented Sept. 25, 1956

2,764,588

STABILIZATION OF HETEROCYCLIC NITROGEN COMPOUNDS

Clyde W. Mertz, Bartlesville, Okla., assignor to Phillips Petroleum Company, a corporation of Delaware No Drawing. Application August 10, 1953, Serial No. 373,440

14 Claims. (Cl. 260—290)

This invention pertains to the stabilization of vinyl-substituted heterocyclic compounds having a hetero nitrogen atom. In one of its aspects the invention pertains to the stabilization of vinylpyridine compounds.

It is known that difficulties are encountered in the manufacture of vinylpyridine and other vinyl-substituted heterocyclic nitrogen compounds because of the tendency of these vinyl compounds to polymerize upon standing at room temperature and upon exposure to elevated temperatures. In the case of vinylpyridines, the presence of soluble and insoluble polymers is particularly undesirable because vinylpyridine compounds are employed as monomers for use in polymerization reactions and the like. Hence, in the preparation of vinylpyridine compounds the steps of distillation and storage have been matters of concern.

In accordance with this invention, it is proposed to add to polymerizable vinylpyridine compounds a novel inhibiting agent or stabilizer. I wish to point out that I intend that the terms "stabilizer" and "inhibiting agent," used herein, shall have essentially the same meaning and that they are used for essentially the same purpose, which is to designate the substances disclosed herein, which prevent polymerization to an extent hereinafter described, and that these terms shall not necessarily denote a mechanism by which this is accomplished.

I have discovered that readily polymerizable vinylpyridine compounds can be effectively stabilized against polymerization by adding to them a compound selected from the group consisting of nitrosyl compounds according to the formula

wherein X is an alkali metal, M is iron, ruthenium, osmium, manganese, or rhenium, and $a$ is an integer equal to the valence of the nitrosylmetallocyanide anion. Specific examples of these nitrosyl compounds which are effective in my invention are sodium nitrosylferrocyanide (sodium nitroprusside), potassium nitrosylferrocyanide, lithium nitrosylferrocyanide, cesium nitrosylferrocyanide, sodium nitrosylruthenocyanide, potassium nitrosylruthenocyanide, lithium nitrosylruthenocyanide, rubidium nitrosylruthenocyanide, cesium nitrosylruthenocyanide, sodium nitrosylosmocyanide, potassium nitrosylosmocyanide, lithium nitrosylosmocyanide, rubidium nitrosylosmocyanide, cesium nitrosylosmocyanide, sodium nitrosylrhenocyanide, potassium nitrosylrhenocyanide, lithium nitrosylrhenocyanide, rubidium nitrosylrhenocyanide, cesium nitrosylrhenocyanide, sodium nitrosylmanganocyanide, potassium nitrosylmanganocyanide, lithium nitrosylmanganocyanide, rubidium nitrosylmanganocyanide, and cesium nitrosylmanganocyanide.

Although in a preferred embodiment this invention pertains to a method for treating polymerizable vinylpyridine compounds with an inhibitor selected from the above described group to stabilize the pyridine compounds at distillation temperatures as well as at room temperature and below, the process of this invention is also applicable to other vinyl-substituted heterocyclic compounds having a hetero nitrogen atom.

The polymerization which is inhibited by the novel stabilizing agents disclosed herein is that which forms an insoluble, hard, porous opaque material often referred to as popcorn polymer.

One group of polymerizable vinyl-substituted heterocyclic compounds containing a hetero nitrogen atom which can be stabilized in accordance with my invention is the mono- and divinylpyridines, with the vinyl group being present in any of the several positions in the pyridine nucleus. Alkyl groups can be present on the ring, or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine, 4-vinylpyridine; 2,5-divinylpyridine; 2-methyl-5-vinylpyridine; 2-vinyl-5-ethylpyridine; 2,3,4, trimethyl-5 - vinylpyridine; 3,4,5,6 - tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-4-vinylpyridine; 3 - dodecyl-2,4-divinylpyridine; 2,3-dimethyl-5,6-dipentyl-4-vinylpyridine; 2-methyl-5-(alpha-methylvinyl) pyridine; 3,5-di(alpha-methylvinyl)pyridine; and the like.

Other polymerizable heterocyclic compounds containing a hetero nitrogen atom included within the scope of this invention are those vinyl and alpha-methyl-vinyl substituted heterocyclic nitrogen compounds in which the ring structure is unsaturated, partially saturated and completely saturated. Examples include vinyl and alpha-methylvinyl substituted quinolines, isoquinolines, piperidines (hexa-hydropyridines), pyrroles, pyrrolidines, pyrrolidones, alkyl derivatives of the foregoing compounds, dihydro and tetrahydropyridines, partially hydrogenated quinolines and isoquinolines, and pyrrolines (dihydropyrroles). Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; vinylpyrrolidone; vinylpyrrole; vinylpiperidine; and vinylpyrrolidine and the like. Normally the vinyl substituent will be attached to a ring carbon atom. However, in compounds wherein the ring nitrogen atom is a secondary nitrogen atom, the vinyl group can instead be attached to this ring nitrogen atom, for example, N-vinylcarbazole and N-vinylpyrrolidone. The process of this invention is particularly applicable to organic or hydrocarbon mixtures containing substantial proportion of a vinylpyridine compound, i. e. that amount which causes difficulties due to its polymerization, e. g. over 50 per cent. Examples of vinylpyridine compounds contained in such mixtures are 2-vinyl-4,6-dimethylpyridine, 2 - methyl-4-vinylpyridine, 2 - methyl-5-vinylpyridine, 5-ethyl-2-vinylpyridine, 5-amyl-2-vinylpyridine.

In carrying out the invention, solution of the stabilizing agent in the vinylpyridine or other heterocyclic compound containing a hetero nitrogen atom to be stabilized can be accomplished in any suitable manner, such as by agitating or stirring the mixture containing the stabilizing agent, or merely by allowing the mixture to stand Ultimately, the decision on what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. Furthermore, the stabilizing agents, disclosed herein, can be used in either a water solution or dissolved in an organic compound which is a mutual solvent for the stabilizing agent and the vinylpyridine compounds desired to be stabilized. Suitable mutual solvents are, generally, the polyhydric alcohols. Reference is also made to the mono-hydric alcohols, glycol ethers, alkyl glycol ethers, glycerol compounds, and the like.

In the practice of our invention a range of concentration from about 0.05 percent to 1.0 per cent, or more, by weight of the nitrosyl compounds disclosed herein will be employed, preferably from 0.1 to 0.5 per cent, all percentages being based on the weight of the heterocyclic compound containing a hetero nitrogen atom to be stabilized. Furthermore, the amount will depend on which particular heterocyclic compound containing a hetero nitrogen atom is concerned.

*Example I*

In order to obtain a sample of 2-methyl-5-vinylpyridine which would polymerize rapidly and consistently, a sample of 95 per cent by weight 2-methyl-5-vinylpyridine was treated in the following manner. A portion of the 95 per cent by weight 2-methyl-5-vinylpyridine was vacuum distilled at approximately 50 millimeters pressure and a kettle temperature of not above 200° F. Approximately 1 per cent by weight of the material remaining in the kettle from this vacuum distillation was added to the sample of 95 per cent by weight 2-methyl-5-vinylpyridine to be tested for polymerization in the presence of the inhibitor. The heavy material obtained in said vacuum distillation was found, upon testing, to comprise divinylpyridine, which is believed to be a precursor of polymerization in heterocyclic nitrogen compounds. A small seed of insoluble 2-methyl-5-vinylpyridine (popcorn polymer) was also added to the test sample and the sample was maintained at approximately 190° F. for the indicated time interval. The results in the absence and in the presence of the inhibitor are shown below in Table 1.

TABLE 1

| Sample Description | Observations |
| --- | --- |
| (1) Control sample (no inhibitor) | All popcorn polymer in 9 hours. |
| (2) Sample plus 0.2 weight percent sodium nitro-prusside. | Solid, no popcorn polymer in 7 days. |
| (3) Sample plus 0.5 weight percent sodium nitro-prusside. | Solid, no popcorn polymer in 12 days. |

From the foregoing it is apparent that the nitrosyl compounds disclosed herein are effective inhibitors of insoluble, or popcorn, polymer formation when heterocyclic compounds having a hetero nitrogen atom are maintained at elevated temperatures, and most remarkably, even when the test solutions are prepared in a manner to make the test conditions most severe.

This invention, therefore, concerns a method for treating polymerizable vinylpyridine compounds with certain nitrosyl compounds to inhibit polymerization at temperatures up to 400° F., as well as at room temperature or below.

In accordance with this invention organic mixtures containing a vinylpyridine, i. e., a vinylpyridine mixed with other organic heterocyclic nitrogen compounds, or pyridine compounds, or purified vinylpyridines, can be stored over long periods of time preferably at room temperature. Likewise, when it is desired to separate a particular vinylpyridine compound from other organic compounds, the stabilized solution can be distilled, preferably at reduced pressure, without any substantial loss of product, the stabilizing agent serving to inhibit polymerization of the vinylpyridine compounds during the process. The instant invention is particularly applicable to mixtures of heterocyclic compounds having a hetero nitrogen atom, containing a substantial proportion of at least one vinyl-substituted heterocyclic compound having a hetero nitrogen atom, i. e., sufficient to cause difficulty due to polymer formation during storage and distillation.

In the practice of this invention the polymer formation inhibiting agents disclosed herein can be used, for example, in the following manner. In the preparation of 2-methyl-5-vinylpyridine from 2-methyl-5-ethylpyridine by dehydrogenation, for example by the method disclosed in the copending application of John E. Mahan, Serial No. 244,469, filed on August 30, 1951, the principal separation is a combined steam and vacuum distillation of the effluent from said dehydrogenation to make a separation between 2-methyl-5-ethylpyridine and 2-methyl-5-vinylpyridine. This is a difficult separation, due to the proximity of the boiling points of the stated components, and because considerable polymerization of the 2-methyl-5-vinylpyridine in said effluent occurs, since said effluent is subjected to heat in the range of 180° to 220° F. during said distillation. After a short period of time operation of the distillation column becomes impossible because of an insoluble polymer which forms in the lower part of the fractionating column and in the kettle. However, by the use of the nitrosyl compounds disclosed herein in accordance with this invention, shut-downs due to polymerization of the 2-methyl-5-vinylpyridine are eliminated.

I have found that when the object is merely to stabilize the distillate from the above-described distillation against the formation of insoluble polymer, the disclosed inhibiting agents can be employed in the lowest proportion which will desirably inhibit the formation of insoluble polymer. For such purpose the feed to the distillation column can be treated with from 0.1 per cent to 0.5 per cent by weight of the inhibiting agent, based on the weight of the vinyl-substituted heterocyclic compound having a hetero nitrogen atom. It is to be noted that the inhibiting agents disclosed herein can be added directly to the reflux of the distillation column, rather than to the feed mixture, in an amount sufficient to stabilize the vinylpyridines depending on operating conditions then being utilized, and in many cases it will be found that a smaller quantity of inhibiting agent is required to produce a stabilized product when this method is followed than when the inhibiting agents are added to the feed mixture.

It will be understood that the foregoing disclosure is illustrative and that other embodiments within the scope of the invention will occur to those skilled in the art. Those skilled in the art will appreciate, for instance, that for the purposes of this invention, vinyl-substituted heterocyclic compounds having a hetero nitrogen atom further substituted with non-interfering groups, for example, halo-, nitro-, amino-, hydroxyl-, and carboxyl-, are the same as non-substituted vinyl heterocyclic compounds having a hetero nitrogen atom.

I claim:

1. A method for inhibiting the polymerization of heterocyclic nitrogen compounds selected from the group consisting of compounds having the general formula

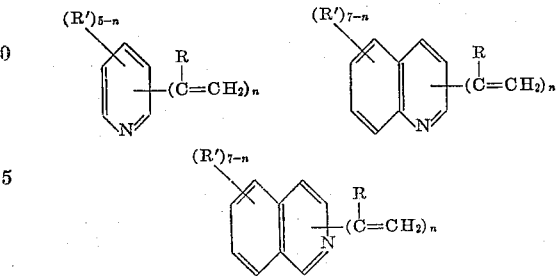

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, which comprises introducing into said heterocyclic nitrogen compounds an inhibiting amount of an alkali-metal nitro-prusside.

2. The method according to claim 1 wherein the inhibitor is from about 0.05 to about 1.0 per cent by weight of sodium nitroprusside.

3. The method according to claim 1 wherein the inhibitor is from about 0.05 to about 1.0 per cent by weight of potassium nitroprusside.

4. A polymerizable heterocyclic base selected from the group consisting of compounds having the general formula

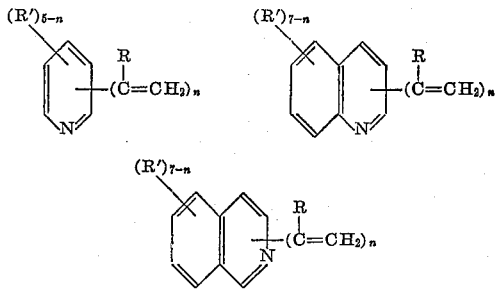

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, said heterocyclic base being stabilized by the addition of a stabilizing amount of an alkali-metal nitro-prusside.

5. The composition of claim 4 wherein the stabilizer is from about 0.1 to about 1.0 per cent by weight of sodium nitroprusside.

6. 2-methyl-5-vinylpyridine stabilized with about 0.1 to about 0.5 per cent by weight of sodium nitroprusside.

7. A composition of matter comprising 2-methyl-5-vinylpyridine having incorporated therein an amount sufficient to stabilize said 2-methyl-5-vinylpyridine against polymerization of sodium nitroprusside.

8. A method which comprises stabilizing polymerizable lower alkyl substituted vinylpyridines with from about 0.05 to about 1.0 per cent by weight of sodium nitroprusside.

9. A method which comprises adding from about 0.1 to about 1.0 per cent by weight of an alkali-metal nitroprusside to a mixture containing a substantial portion of lower alkyl substituted-vinylpyridines, said alkali-metal nitroprusside inhibiting the polymerization of said lower alkyl substituted-vinylpyridines during distillation of said mixture.

10. A process for inhibiting the polymerization of 2-methyl-5-vinylpyridine during the distillation of a mixture containing a substantial portion of said 2-methyl-5-vinylpyridine which comprises introducing into said mixture from about 0.1 to about 0.5 per cent by weight, based on said 2-methyl-5-vinylpyridine, of an alkali-metal nitroprusside.

11. The process according to claim 9 wherein the inhibitor is introduced into the reflux of the distillation zone.

12. In a process for preparing 2-methyl-5-vinylpyridine comprising the dehydrogenation of 2-methyl-5-ethylpyridine and the fractional distillation of the resulting effluent from said dehydrogenation, wherein said effluent is subjected to heat in the range from 180° to 220° F., a method for inhibiting insoluble polymer formation in said heated effluent which comprises introducing to said effluent, in an amount sufficient to inhibit polymerization an alkali-metal nitroprusside compound.

13. A method for stabilizing 2-methyl-5-vinylpyridine against polymerization, which comprises, treating said 2-methyl-5-vinylpyridine with an amount of sodium nitroprusside sufficient to inhibit said polymerization.

14. A method which comprises stabilizing polymerizable lower alkyl substituted vinylpyridines with from about 0.05 to about 1.0 per cent by weight of potassium nitroprusside.

References Cited in the file of this patent

UNITED STATES PATENTS

| | | |
|---|---|---|
| 2,225,471 | Foord | Dec. 17, 1940 |
| 2,402,806 | Durland | June 25, 1946 |

OTHER REFERENCES

Ephraim: Inorg. Chem., 5th ed., p. 692 (1948), Interscience Publishers, Inc.

Laidler: Chem. Kinetics, pp. 190–91 (1950), McGraw Hill Book Co.

Frank et al.: JACS, vol. 68, p. 908 (1946).